Dec. 28, 1965  J. T. HANSEN ETAL  3,225,542
SPEED CONTROL SYSTEM
Filed March 16, 1964  4 Sheets-Sheet 1

INVENTORS
JACK T. HANSEN
BY JOSEPH W. BROOME
*Blair & Buckles*
ATTORNEYS

INVENTORS
JACK T. HANSEN
JOSEPH W. BROOME
BY
Blair & Buckles
ATTORNEYS

United States Patent Office 3,225,542
Patented Dec. 28, 1965

3,225,542
SPEED CONTROL SYSTEM
Jack T. Hansen, Arlington, and Joseph W. Broome, Sudbury, Mass., assignors to The Oilgear Company, Milwaukee, Wis.
Filed Mar. 16, 1964, Ser. No. 352,392
25 Claims. (Cl. 60—53)

This invention relates to an improved speed control unit. More particularly, it relates to a servo system which compares a continuously varying input position signal with an output position signal to derive a position error signal. This error signal then serves as the command signal for a conventional velocity-control inner servo loop which directly controls the output velocity.

The invention also concerns a multiple unit system in which a number of speed control units of the above type provide output speeds related to each other almost exactly according to predetermined ratios. The system may be used, for example, to maintain the correct speed relationships among the successive stands of a rolling mill.

For illustrative purposes, the invention will be described with specific reference to a steel rolling mill; its utility in other applications will be apparent.

A conventional way of controlling the speed of a rotating shaft is to drive the load with a hydraulic motor, either alone or in combination with another prime mover such as an electric motor. The speed of the hydraulic motor may be adjusted by varying the flow of hydraulic fluid thereto from a suitable pump. Precision systems often incorporate variable displacement pumps; the pump displacement largely determines the flow rate and thus controls motor speed. However, large load changes may cause motor speed changes of up to 10 percent.

To compensate for load variations, a servo control system regulating the pump stroke or displacement is used to maintain motor speed. A tachometer provides a signal indicative of the motor speed. This signal is compared with a command signal corresponding to the desired speed and the comparison results in an error signal indicating the difference between actual and desired speed. The error signal alters the pump displacement and thereby changes the hydraulic motor speed in such manner as to bring the tachometer output toward equality with the command signal, i.e. make the output speed correspond to the desired speed.

Because of various inaccuracies in the system, e.g. in the tachometer measurements, the accuracy of speed control is limited to about 0.25 percent. This is satisfactory for many industrial applications. However, more and more applications require greater accuracy.

An example of the trend toward tighter tolerance requirements is the multiple stand rolling mill. The relatively slow speeds and wide inter-stand spacings of such mills have, in the past, permitted an operator to maintain the correct relationships between the roll speeds at the individual stands. However, it is desirable to increase speed and decrease interstand spacing, so as to increase output and improve the quality of the rolled product, as well as reduce space requirements. Manual speed control will not suffice for the accurate speed regulation and fast adjustment to changes in loading required by such a system. Nor do the conventional analog servo control systems provide the performance needed in such circumstances.

Accordingly, it is an object of the present invention to provide an improved multiple operation system, such as a multiple stand rolling mill or the like, having accurate control of the relative speeds of the various operations.

Another object of the invention is to provide a system of the above type capable of close control of the absolute speeds of the various operations.

A more general object of the invention is to provide a multiple output mechanical system having accurately related output speeds; and a further related object is to provide a system of this type having accurate control of the absolute values of the output speeds.

Another object of the invention is to provide systems of the above type capable of handling heavy loads, e.g. several horsepower or more.

A further object of the invention is to provide systems of the above type output shaft powered, at least in part, by closely controlled hydraulic motors.

Yet another object of the invention is to provide a speed control unit capable of close control of a rotating or translating member such as a shaft or the like.

A still further object of the invention is to provide a speed control unit combining accuracy of speed control with fast recovery in response to changes in the load imposed on the output shaft.

A more specific object of the invention is to provide a speed control unit of the above type utilizing hydraulic actuation for at least part of the power supplied to the output shaft.

Yet another object of the invention is to provide a speed control unit which maintains an essentially zero average error in output speed even after changes in the load imposed on the system whose speed is controlled.

A further object of the invention is to provide a speed control unit adapted for use in multiple-operation and multiple-output systems of the above type.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 1:
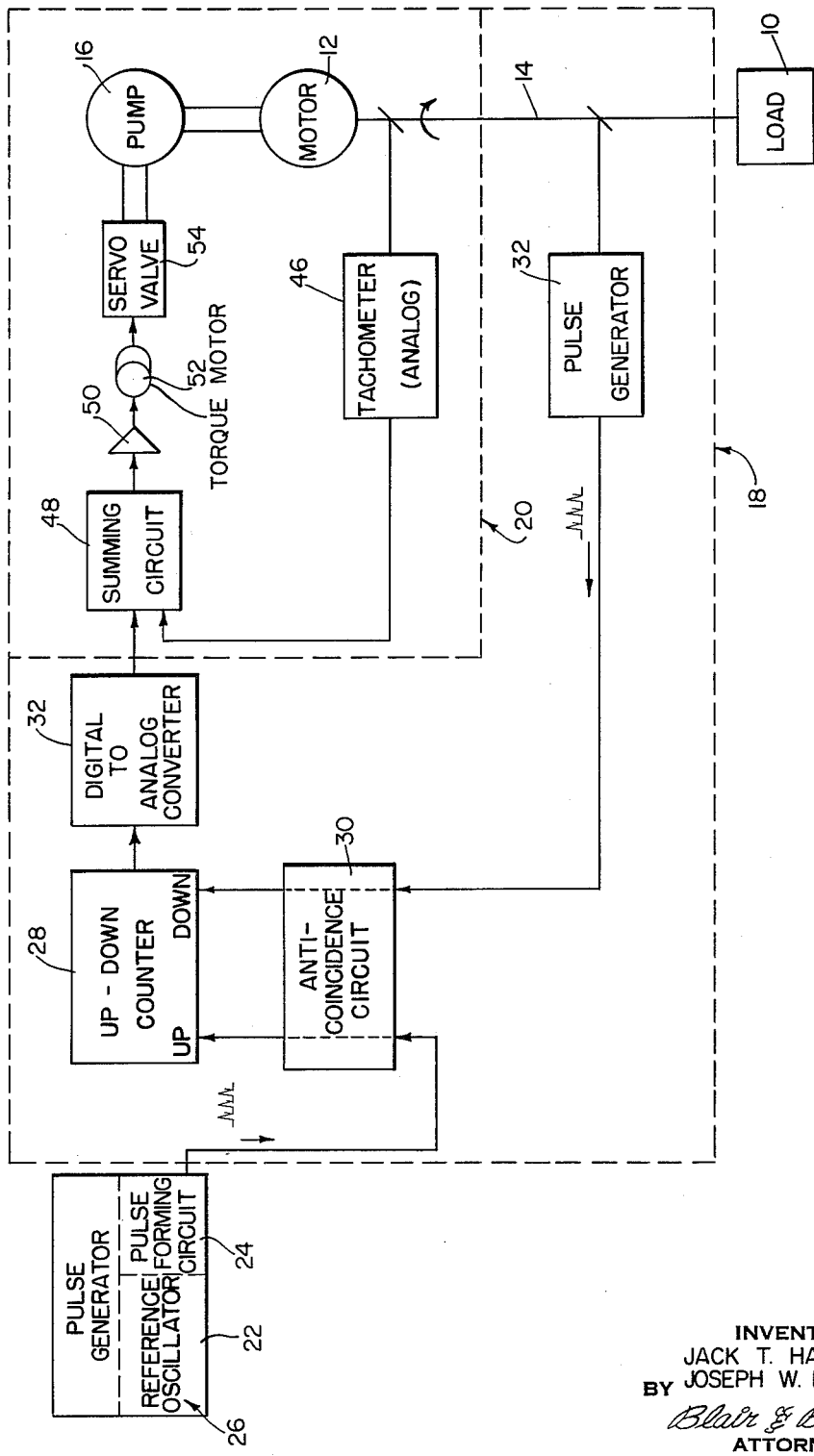
FIG. 1 is a schematic diagram of a speed control unit embodying the present invention.

In general the present invention is embodied in a speed control unit employing a dual servo loop arrangement. Of the two servo loops, one is an inner loop which functions in the same manner as a conventional velocity control servo system.

The second loop is an outer loop encompassing the entire system. It is a position control circuit having a constantly changing command signal. That is, the command signal indicates a requirement for a continuous change in position. The error signal, i.e. the error between the commanded and actual positions, serves as a velocity command for the inner loop.

More specifically, the input command signal is derived from a reference oscillator. Each cycle in the output of the oscillator represents a desired incremental change in the position of a shaft whose velocity is to be controlled. An alternating-current generator connected to the shaft has an electrical output in which each cycle represents an increment of actual change in shaft position. If the rate of change of shaft position is the same as the rate of change of position represented by the cyclic rate of the reference oscillator, the shaft-connected generator will emit one cycle for each cycle from the oscillator. That is, the number of cycles from the oscillator and the generator will be the same during any period in which the total change of shaft position equals the total of position commanded by the referenced oscillator.

On the other hand, if the shaft should speed up, for example due to a decrease in the load imposed thereon, the shaft-connected generator will provide output cycles at a greater rate than the oscillator. Conversely, if the shaft should slow down, the cyclic rate of the generator will be less than that of the oscillator.

The outputs of the oscillator and generator are applied to an accumulator which in essence accumulates the difference between the number of cycles from these two sources. Specifically, the accumulator in effect develops a signal of one polarity whose magnitude corresponds to the number of cycles received from the oscillator and a second signal of the opposite polarity whose magnitude corresponds to the number of cycles from the generator. The output signal of the accumulator is the difference between these two individual signals. Accordingly, the output has a polarity which depends on whether fewer or more cycles have been received from the shaft-connected generator than from the reference oscillator, with the magnitude of this signal depending on the difference in the number of cycles from the two sources.

Thus, the output of the accumulator indicates (1) whether the shaft leads or lags the command signal from the reference oscillator and (2) the magnitude of this lead or lag. In other words this signal is a position error signal. It is used as a velocity command for the inner servo loop. If the shaft is moving more slowly than the change in position commanded by the reference oscillator, the position error signal increases, to command an increase in velocity. Similarly, if the shaft speeds up, the change in position error signal causes a decrease in velocity.

The inner loop may take either one of two forms. One of these may be termed a direct velocity control servo system in which the feedback signal is developed by a tachometer connected to the output shaft and thus is a direct measurement of the velocity. The other type is an indirect velocity control circuit in which the feedback signal is indicative of the position of a member having direct control of velocity. For example, in a hydraulic motor powered by fluid flow from a variable flow pump, the feedback signal might be developed by a transducer connected to the pump stroker. As set forth more fully below, these two types of inner servo loop provide the speed control unit with different characteristics.

Among the advantages of the speed control unit is the fact that the input signal can be a time or frequency reference. Since frequency is the most accurately controlled of all parameters, the speed command may be made as accurate as desired. Secondly, since the position of the output shaft is directly controlled in accordance with the input signal, the shaft position is never allowed to depart radically from the command, except for short periods of time. Thus, the velocity, which is the time rate change of position, has an average error which is substantially zero with respect to the commanded velocity. In fact, if the inner servo loop is of the direct velocity controlled type, the average velocity error may be brought to exactly zero. The short term average velocity is readily controlled within an accuracy of 0.03 percent of maximum motor speed.

The speed control unit is well adapted for use in multiple output systems. One such system is a rolling mill having a plurality of stands which must run at different speeds in order to accommodate the reduction in thickness of the rolled material and varying diameters of the rolls. It makes use of a central reference generator and individual speed control units for the respective stands. A frequency conversion circuit is interposed between the reference source and the speed control units so as to provide the desired input frequencies therefor. Thus, a change in reference frequency, while changing the speed of the entire system, maintains constancy of the relationships between the individual speeds of the stands.

We prefer to derive the input command signal for each speed control unit in the rolling mill from the signal applied to the preceding speed control unit. For example the output of the reference generator may be used, with some modifications, for the input signal of the last stand in the mill. This input signal in turn is changed in frequency by a frequency converting circuit to serve as an input signal for the next preceding stand. The latter signal in turn may be further changed in frequency to provide an input signal for a third stage, and so on through all the stands of the rolling mill. In the frequency converting circuits described below the change in frequency at each stage is variable and this leads to an important advantage of this type of system.

More particularly, assuming use of the speed control system in a rolling mill or the like, it may happen during operation that the speed ratio of two adjacent stages is incorrect. For example, in a rolling mill a loop may form between two stands. This problem can be corrected, for example, by changing the speed of the first of these stands, i.e. the one through which the material passes first. However, the speed must be changed without changing the speeds of the stands following the corrected stand; furthermore, the speeds of all the preceding stands must be changed in proportion if the correct relationship between these speeds is to be maintained. This is accomplished by the above frequency converting circuits, since a change in the frequency reduction ratio at any stage causes a corresponding change in the input frequencies of the speed control units in all the preceding stages.

In FIG. 1, we have illustrated a typical installation involving use of the speed control unit to control the speed of a load-driving shaft. In this case, a load 10 is connected to a hydraulic motor 12 by way of a shaft 14, the motor 12 being driven by a variable stroke hydraulic pump 16. The speed of the motor 12 can be adjusted by varying the stroke of the pump 16 as more fully described below.

The speed control unit, which controls the rotational speed of the shaft 14, includes an outer servo loop generally indicated at 18, and an inner servo loop generally indicated at 20. In the illustrated embodiment the input command signal is derived ultimately from a stable reference oscillator 22. However, it is preferable that the command signal take the form of pulses rather than the sine wave output of an oscillator, and to this end the oscillator output is pased through a pulse forming circuit 24. The oscillator and pulse forming circuit are thus the constituent parts of a pulse generator 26, whose output consists of a series of pulses, a pulse being emitted for each cycle in the oscillator output. The pulses from the generator 26 are passed to one input of an up-down counter 28 by an anti-coincident circuit 30. For illustrative purposes, this input of the counter is the "up" input.

The counter 28 operates as an accumulator and it serves a dual function. In the first place, it is analogous to the summing circuit used in conventional servo systems to develop an error signal by comparing the command signal with a second signal indicating the actual value of the controlled parameter. Secondly, insofar as the velocity of the shaft 14 is concerned, it accumulates the error in a manner analogous to an integrator in a conventional analog servo system.

More specifically, a pulse generator 32 coupled to the shaft 14 emits a pulse each time the shaft 14 passes through a predetermined angular increment, e.g. 30 degrees. The pulses from the generator 32 are fed to the "down" input of the counter 28, again by way of the anti-coincident circuit 30. The content of the counter 28 is converted to an analog singal by a digital-to-analog converter 32 and the output of this converter serves as the command signal for the inner servo loop 20. The servo loop 20 is a conventional analog velocity control servo circuit, described in detail hereinafter.

In considering the operation of the system, assume first of all that the velocity command signal at the input of the inner servo loop 20 is of a magnitude sufficient to provide the correct output speed of the shaft 14. The counter 28 contains a count which is a digital representation of the velocity command signal. Each pulse from the generator 26 corresponds to a commanded change in position of the shaft 14 by one increment, and as already noted, each pulse from the generator 32 indicates an actual change of position by a single increment. With the shaft 14 at correct speed, i.e. the shaft changing position at a rate equal to the rate of change of position commanded by the generator 26, a pulse from the generator 32 is applied to the "down" input to the counter 28 for each pulse from the generator 26 applied to the "up" input. Thus, the content of the counter undergoes no net change and the level of the velocity command signal applied to the inner loop 20 is maintained.

Since the signals applied to the up and down inputs of the counter 28 do not occur at the same time there is, of course, a small periodic variation in the counter content. The variation has a magnitude of one count and it occurs at the frequency of the generator 26. Therefore, this frequency is preferably greater than the highest frequency accommodated by the system. That is, this variation occurs at a rate which the system cannot follow and therefore, it has no effect on the speed of the shaft 14.

Next, assume a sudden increase in the load imposed on the shaft 14. Initially the shaft will slow down and the pulse rate from the generator 26 will exceed the pulse rate of the generator 32. Therefore, there will be a net increase in the content of the counter 28. The resulting change in the output of the converter 32 corresponds to an increase in the commanded velocity applied to the inner servo loop 20. This will tend to increase the speed of the shaft 14 and quickly bring it back to the desired value.

If the speed of the shaft 14 begins to increase, the reverse effect will take place. The content of the counter 28 will decrease, with a resultant decrease in the velocity command signal applied to the inner loop 20 and appropriate correction of the shaft speed.

The commanded speed of the shaft 14 can be changed by varying the frequency of the reference oscillator 22. This causes a change in the content of the counter 28 and the magnitude of the velocity command signal applied to the inner servo loop 20. This change continues until the speed of the shaft 14 attains the desired value. The content of the counter then remains constant at its new level.

The anti-coincidence circuit 30 prevents the application of pulses simultaneously to the "up" and "down" inputs of the counter 28. It may take any of several conventional forms. Generally such circuits operate to synchronize the pulses from the two sources with respect to an internal pulse generator, so that the input pulses are converted to transfer pulses bearing predetermined time relationships. That is, the transfer pulses are synchronized with respect to the internal pulse generator. Thus, the transfer pulses derived from the generator 32, for example, may be delayed a fixed minimum time relative to transfer pulses derived from the generator 26. The counter 28 may then count transfer pulses from both sources without any coincidence problem.

With further reference to FIG. 1, the inner servo loop 20 includes an analog tachometer 46 coupled to the shaft 14 and providing an electrical output indicative of the speed of the shaft. (This should be contrasted with the pulse generator 32 whose output indicates shaft position.) The output of the tachometer 14 is added to the command signal from the converter 32 in a summing circuit 48 whose output is amplified by an amplifier 50. The amplifier 50 in turn powers a torque motor 52 connected to a servo valve 54. The valve 54 controls the flow of hydraulic fluid to pistons connected with the stroking mechanism in the pump 16 and in this manner controls the stroke of the pump and thereby its hydraulic output to the motor 12.

Thus, the servo loop 20 is a conventional analog velocity-controlling servo loop. The difference between the output of the tachometer 46 and the velocity command signal indicates a difference between the commanded and desired speeds of the shaft 14. The resulting error signal in the output of the summing circuit is utilized by the torque motor 52 and valve 54 to correct the stroking mechanism in the pump 16 in such manner as to minimize the velocity error. When the velocity error is at or close to zero the reduction in error voltage causes the servo valve 54 to shut off and thereby maintain a constant stroke in the pump 16. It will be observed that in addition to the velocity correcting operation of the outer loop 18 already discussed, the inner servo loop 20 also applies its own corrective action to errors in the speed of the shaft 14.

However, the loop 20 by itself does not provide the results obtained by conjoint use of the two loops. In the first place, there is a small but finite threshold value of error voltage at the output of the summing circuit 48 below which the torque motor 52 will not apply corrective action to the pump 16. This threshold level corresponds to an error in shaft speed which is not correctable by the loop 20 without integrating the output of the circuit 48 and thereby slowing down the corrective action of the servo loop. Secondly, the tachometer 46 is a source of long term error in converting shaft speed to an electrical signal, and indeed this error is large enough to be the limiting factor in the overall accuracy of analog velocity-controlling servo systems. A third source of error is the circuit generally used to provide the command signal in a velocity-controlling system. The accuracy of such signals is generally limited to the accuracy of a voltage source and voltage-dividing resistors used in conjunction therewith.

The addition of the components needed to form the outer loop 18 substantially eliminates these problems. Specifically, the use of frequency as a reference in developing a common signal permits one to obtain a reference having the highest accuracy. Similarly, since the generator 32 indicates changes in position of the rotating shaft 14 rather than velocity, it is not subject to the errors encountered with the analog tachometer 46. Even if there is an error in the angular position of the shaft at which a given pulse is emitted, this error is not cumulative, since a corresponding pulse will be emitted at the same position of the shaft 14 during each rotation thereof. Therefore, even if there is a small position error, there is essentially no resulting velocity error.

Accuracy is further enhanced by the use of a digital system, i.e. the counter 28, to develop a position error signal. Operation of the counter is not affected by small variations in the values of the various circuit parameters, either in the counter itself or the other circuits associated with the position pulses. Nor is it affected by noise, as long as the pulse amplitude is made substantially greater than the noise level and suitable amplitude sensing circuits are used.

Nor is extreme accuracy required in the digital-to-analog converter 32. If the velocity command signal appearing at its output differs somewhat from the value corresponding exactly to the content of the counter 28, e.g. due to voltage changes, the counter will merely accumulate a slightly different count to provide the correct voltage at the output of the converter 32.

Additionally, the counter 28 accumulates the error signal, so that no matter how small the difference between the actual speed of the shaft 14 and the desired speed indicated by the frequency of the pulse generator 26, the content in the counter 28 will change sufficiently to provide corrective action. This does not slow down operation of the control system as would substantial integration between the summing circuit 48 and the torque motor 52 as discussed above.

Conversely, the full advantages of the outer servo loop are not realized without the additional components forming the inner servo loop 20. For example, the inner loop responds more quickly to sudden changes in the speed of the shaft 14. Moreover, it provides "coarse" control of shaft speed and thus the outer loop needs to accommodate only the residue of the control function beyond the capability of the loop 20. This simplifies the equipment required in the outer loop. It also aids in maintaining a fast response, since the speed of response is inversely related to the excursion of the counter 28 required for corrective action.

Figure 3:
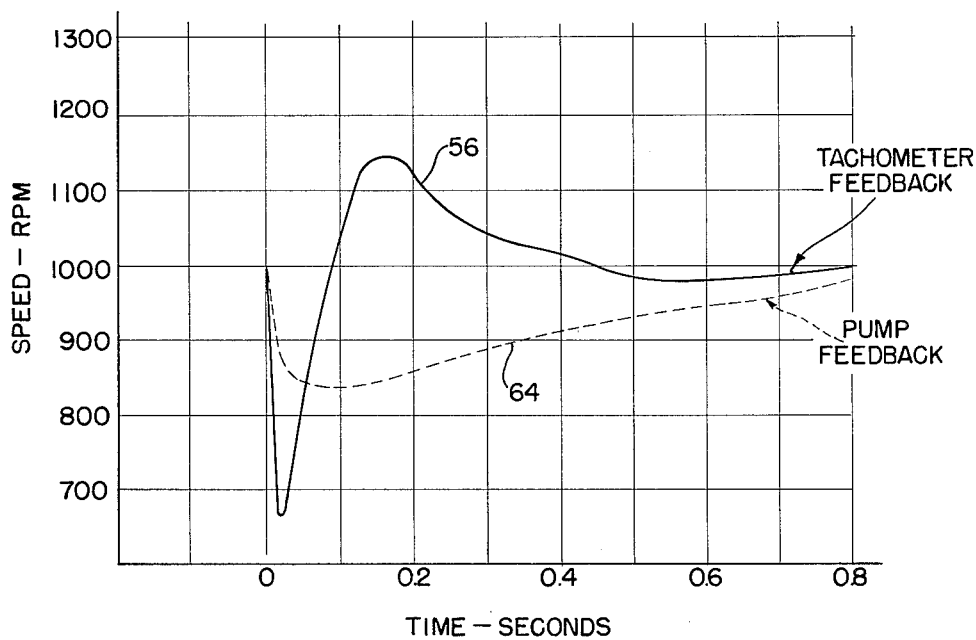
FIG. 3 is a graphical representation of the response characteristics of the units of FIGS. 1 and 2.

The curve 56 of FIG. 3 illustrates the response time of a system employing the speed control unit of FIG. 1. The speed control unit controlled the speed of a 12 horsepower drive with a commanded speed of 1,000 r.p.m. The rated load was suddenly applied at time, $t=0$. The output shaft immediately slowed down, but the speed was quickly increased so that by the end of 0.1 second, there was a lag of only 97 degrees in the shaft position, as compared to the commanded position which would have been followed in the absence of the disturbance. During the next third of a second, the shaft position advanced about 121 degrees. This more than made up for the 97 degree lag and resulted in a net 24 degree advancement in instantaneous shaft position. During the following third of a second, the instantaneous shaft position returned to zero displacement from the commanded position.

Thus, within 0.8 second after no-load to full-load change, the shaft was at the same instantaneous position it would have reached had there been no disturbance at all. Recovery from most of the disturbance took place within the first half second and for most applications, the recovery obtained within 0.3 second would be considered essentially complete. It should be emphasized that the transient illustrated in FIG. 3 is much greater than what one will ordinarily expect in most applications.

It is noted that since the speed control unit of FIG. 1 returns the output shaft to exactly its commanded position after a change in load, there is a zero average velocity error between the beginning and end of the transient. This results from the fact that the inner servo loop 20 employs velocity feedback from the shaft 14. With velocity feedback, the command signal required to obtain a given velocity is the same regardless of the magnitude of the load imposed on the output shaft. Since the velocity command at the input of the loop 20 is thus returned to its original value after a transient, the content of the counter 28 must be the same after the transient as before. This will be the case only if the shaft 14 has returned to its original position relative to the position commanded by the pulse generator 26.

Figure 2:
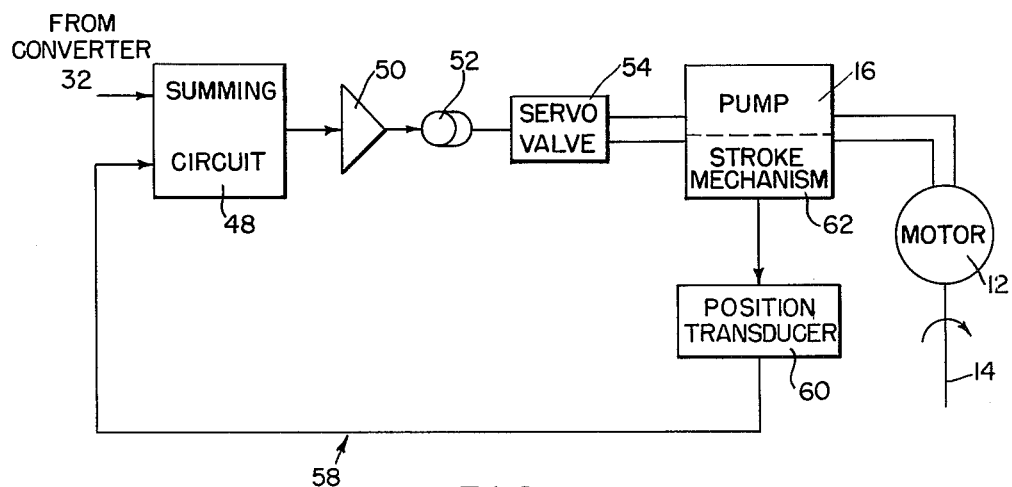
FIG. 2 is a schematic diagram of an inner servo loop which may be incorporated in the speed control unit of FIG. 1.

FIG. 2 illustrates a second inner servo loop 58 which, when substituted for the inner loop 20 of FIG. 1, provides the speed control unit with somewhat different characteristics. Instead of feeding back to the summing circuit 48 a signal directly indicating the velocity of the shaft 14, the loop 58 employs a position transducer 60 which indicates the position of the stroke mechanism 62 in the pump 16.

There is a small but finite amount of leakage in the motor 12 and pump 16 and this leakage increases with the load imposed on the motor. To compensate for this, the stroke mechanism 62 must be advanced as the load increases in order to maintain a given shaft speed. Thus, the command signal for the servo loop 58 provided by the converter 32 must increase with the magnitude of the load. There must be a corresponding increment in the content of the counter 28. Since the counter content is a measure of the lag of the shaft positoin behind the position commanded by the pulse generator 26, the lag must change according to the load imposed on the system. This is accomplished by a change in the average velocity of the shaft 14 during the period in which the system adjusts to the new load.

Accordingly, even though the velocity is returned to the commanded value after a change in load there is a net error in average velocity. In many applications, this error is insignificant, especially when averaged over a long period of time.

It will also be apparent that the time required for the speed control unit to respond to a sudden change in load conditions is greater when the inner servo loop 58 is employed, than with the inner loop 20 of FIG. 1. This follows from the fact that the only velocity feedback is by way of the pulse generator 32 and the development of the full velocity error signal must await a change in the content of the up-down counter 28 corresponding therewith.

The resulting response characteristics to be expected from a typical speed control unit incorporating the inner loop 58 are represented by the curve 64 of FIG. 3. As indicated by this curve, the initial change in shaft speed is somewhat less than that registered by the curve 56 discussed above. Moreover, there is essentially no overshoot following initial recovery from the disturbance. Recovery is a somewhat slower process continuing in the same direction until the initial speed is regained. Even so, the major portion of speed recovery occurs within a relatively short time after the initial disturbance, and this is sufficient for almost all applications.

In some cases, the recovery characteristics of curve 64, representing the servo loop 58, are preferable to the characteristics of the curve 56, representing the inner loop 20. Specifically, in certain applications the overshoot may be undesirable and elimination thereof is accomplished by using the servo loop 58. Undesirable overshoot can also be dealt with by introducing sufficient damping in the servo control unit illustrated in FIG. 1.

Figure 4:
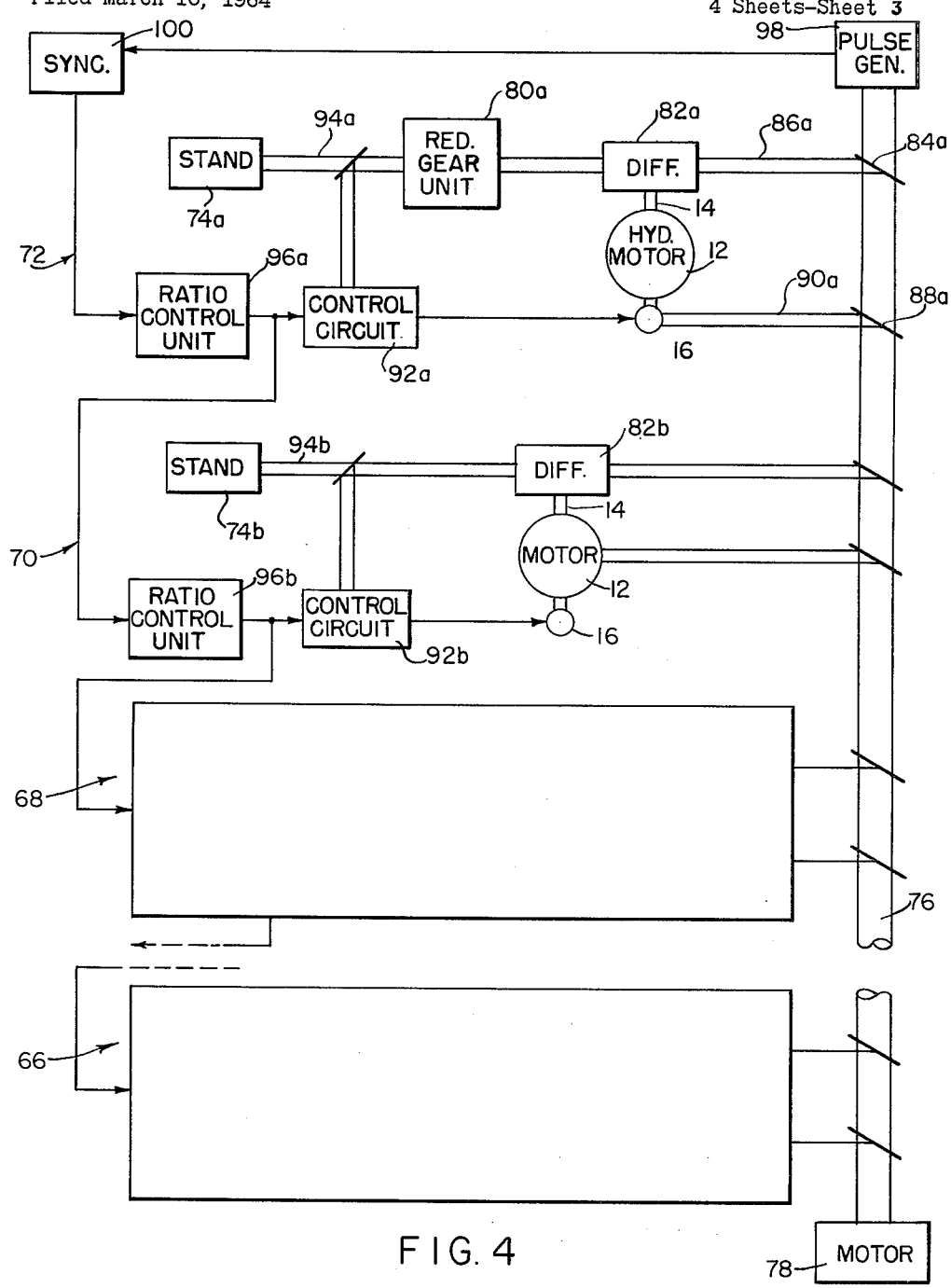
FIG. 4 is a fragmentary schematic diagram of a steel rolling mill incorporating the invention.

In FIG. 4, we have illustrated the application of the speed control unit of FIG. 1, to a multiple stand rolling mill. The mill includes stages 66, 68, 70 and 72 as well as other stages not shown in the drawing. Each of the stages includes a stand 74 containing rolls suitable for the reduction and forming of steel bar, strip, etc. All of the power for the stand is derived ultimately from a main shaft 76 connected to a motor 78.

More specifically, wtih reference to the stage 72, which has the same construction as the other stages of the mill, the stand 74a therein is driven through a reduction gear unit 80a by a differential 82a. One input for the differential 82a is obtained directly from the shaft 76 by means of a gear 84a and a shaft 86a. The other differential input is from the shaft 14 and hydraulic motor 12 of a system of the type illustrated in FIG. 1. Again the motor 12 is powered by the pump 16, and the pump in turn receives its power from the main shaft 76 through a gear 88a and shaft 90a. The reference numeral 92a indicates a control circuit consisting of the portions of the servo loops 18 and 20 of FIG. 1 not separately shown in FIG. 4.

The pulse generator 32 and tachometer 46 (FIG. 1) contained in the control circuit 92 are coupled to a shaft 94a directly connected to the stand 74a so as to provide direct, accurate indications of the position and speed of this shaft. Alternatively, the transducers might be connected directly to the output of the differential 82a. The output speed of the differential 82a is the algebraic sum of the speeds of the shafts 86 and 14.

The speed of each stand 74 in the mill depends on two factors, viz. the desired speed of operation of the mill as a whole and the relationships between the speeds of the individual stands. In each stand of the rolling mill the cross-section of the material passing therethrough is decreased. There is a corresponding increase in the length of the material and therefore succeeding stands must operate at successively greater speeds. If the stage 66 of FIG. 4 is the first stage of the mill, it will operate at the lowest speed and the stages 68, 70 and 72 will operate at successively greater speeds. The ratio of the speeds between any two adjacent stands depends on the amount of reduction accomplished in the first of these two stands through which the material passes. This in turn depends on such factors as the cross-sectional shape to be obtained, the size and shape of the material fed into the mill, etc.

It will be observed that while close control of the various speed ratios is required, the absolute value of the speeds does not have to be maintained within such close tolerances. That is, the overall speed of the mill may be allowed to vary over relatively wide limits, but the relationships between the speeds of the individual stages must be maintained within very narrow limits. If only a single or a small number of internal speed ratios were required, this could be accomplished simply by the use of a mechanical gearing arrangement. However, variation among a large number of ratios is required, both because of variations in the various factors given above, and also because of changes in the raw material from lot to lot, wear of the rolls and other factors requiring slightly different ratios. The manner in which such variable and closely maintained ratios are accomplished will now be described in detail.

As shown in FIG. 4, a pulse generator 98 driven by the shaft 76 supplies pulses to a ratio control unit 96a in the stage 72 by way of a synchronizer 100. The ratio control unit 96a supplies output pulses to the control circuit 92a connected thereto at a rate which is a variable but predetermined ratio of the rate at which pulses are emitted by the generator 98. Thus, by virtue of the feedback from the shaft 94a, the speed control unit incorporating the control circuit 92a maintains the ratio of the speed of the stand 74a to that of the shaft 76 in accordance with the setting of the ratio control unit 96a. Assuming, for example, that the gear 84a has a unity ratio so that the shaft 86a has the same speed as the shaft 76, the speed of the shaft 14 will be the difference between the speed of the shaft 76 and the speed of the shaft 94a set by means of the control unit 96a (allowing, of course, for the reduction in the gear unit 80a). That is, the speed of the shaft 94a is the sum of the speeds of the shaft 14 and 86a, as noted above.

The variation of the speed of the shaft 94a required by the system is relatively small compared to the speed of the shaft 86 and since this variation is accomplished by varying the speed of the shaft 14, this means that the maximum speed of the latter shaft is much less than the speed of the shaft 86a. Accordingly, the hydraulic motor 12 supplies at most a small portion of the power delivered to the shaft 94a; the motors 12 and pumps 16 may therefore be smaller and less expensive than if they were to provide all the power for the stands 74.

The speed of the shaft 94a may be greater or less than the speed of the shaft 86a and therefore the hydraulic motor 12 must be able to run in both directions so as to add to or subtract from the speed of the shaft 86a in the differential 82a. This in turn requires reversible flow from the pumps 16 and a resulting minor modification if the inner servo loop 58 of FIG. 2 is to be used.

More specifically, with reference to FIG. 2, the summing circuit 48 may include a reference voltage source whose voltage is subtracted from the analog representation of the content of the counter 28 (FIG. 1). By way of example, this reference voltage may be equivalent to one-half the capacity of the counter. Thus, if the counter has a capacity of 128, the reference source has a voltage corresponding to a count of 64; this voltage is subtracted from the analog representation of the count by a suitable summing circuit (not shown) incorporated in the converter. Therefore, whenever the count is greater than 64, the output of the converter is a positive voltage whose magnitude corresponds to the amount by which the reference voltage is exceeded. On the other hand, if the count is less than 64, the output voltage of the converter is negative and its magnitude corresponds to the amount by which a reference level exceeds the content of the counter.

A positive velocity command voltage at input of the inner loop 58 causes the servo valve 54 to move the stroke mechanism incorporated in the pump 16 in a direction causing the motor 12 to rotate in one direction; a negative command voltage from the converter 32 causes rotation of the motor 12 in the oposite direction.

This modification is not required with the innerloop 20 of FIG. 1.

It will be noted that with the particular control circuit configuration illustrated in FIG. 1, a positive velocity command signal for the inner loop 20 will be provided whenever the shaft 94 (FIG. 4) is to run faster than the shaft 86. There will be a negative voltage when the shaft 94 is to run more slowly than the shaft 86. If the shafts 94 and 86 are to run at the same speed, the velocity command signal from the converter 32 (FIG. 1) will be zero and the hydraulic motor 12 will therefore be stationary.

Thus, with reference to FIG. 4, it is seen that the signals fed back to the control circuit 92a from the shaft 94a cause the hydraulic motor 12 to supply the speed increment which, when added to the speed of the shaft 86a, brings the speed of shaft 94a into correspondence with the pulse rate from the control unit 96a.

In the stage 70 the input pulses for the ratio control unit 96b are obtained from the ratio control unit 96a of the stage 72. Thus the output pulses of the control unit 96b are provided at a rate which is related to the pulse rate from the control unit 96a by the ratio to which the control unit 96b is set. The pulse rate at the output of the control unit 96b determines the speed of the shaft 94b driving the stand 74b, and therefore, the ratio of the speed of the stand 74b to that of the stand 74a is governed exclusively by the setting of the ratio control unit 96b.

Similarly, the output of the ratio control unit 96b serves as the input for the ratio control unit in the stage 68, and so on up the line. Thus the relative speeds of the respective stands in the rolling mill are governed by the settings of the ratio control units 96 and independent of the speed of the motor 78 and main shaft 76. On the other hand, the overall speed of the mill does depend on the speed of the motor, since the pulse generator 98 connected to the shaft 76 provides the input for the ratio control unit 96a. Accordingly, the speed of operation can be altered by changing the speed of the motor 78.

It should be noted that if the setting of a ratio control unit is changed, this changes the speed not only of the stage in which the ratio control unit is connected, but also in the preceding stages of the mill. For example, if the setting of the control unit 96b is changed, this will change the ratio of the speed of the stand 74b to that of the stand 74a in the succeeding stage 72. The pulse rate in the input of the ratio control unit in the stage 68 is changed in the same ratio and therefore, the speed of the stage 68 is changed in proportion. This maintains the proportionality between the speeds in the stages 68 and 70. Similarly, the speeds in the stages preceding the stage 68 are changed in proportion. Thus, whenever the setting of a ratio control unit 96 is corrected, the correction is automatically made to the preceding stages in the mill.

The importance of this feature will be apparent from consideration of the following example. Suppose that a loop begins to develop in the rolled material between the stands 74a and 74b. This condition can be corrected by slowing down the stand 74b through adjustment of the ratio control unit 96b. If the speed of the stage 68 is not adjusted in proportion, a loop will then develop between the stages 68 and 70. Thus, successive corrections are required all the way back to the first stage of the rolling mill. However, since the speeds of the preceding stages are in fact adjusted proportionately to the change in the speed of the stage 70, the one adjustment in the ratio control unit 96b suffices for the entire mill.

It should be noted that equivalent operation can be obtained by injecting the output of the pulse generator 98 into the first stage 66 of the rolling mill, with the outputs of the ratio control units being fed to successive ratio control units in the direction of material flow. In this case, adjustment to correct an improper speed relationship between two successive stages will be accomplished by altering the setting of the ratio control unit in the second of the two stages through which the material passes. The adjustment will then be carried out proportionately through successive stages to the output end of the mill.

Figure 5:
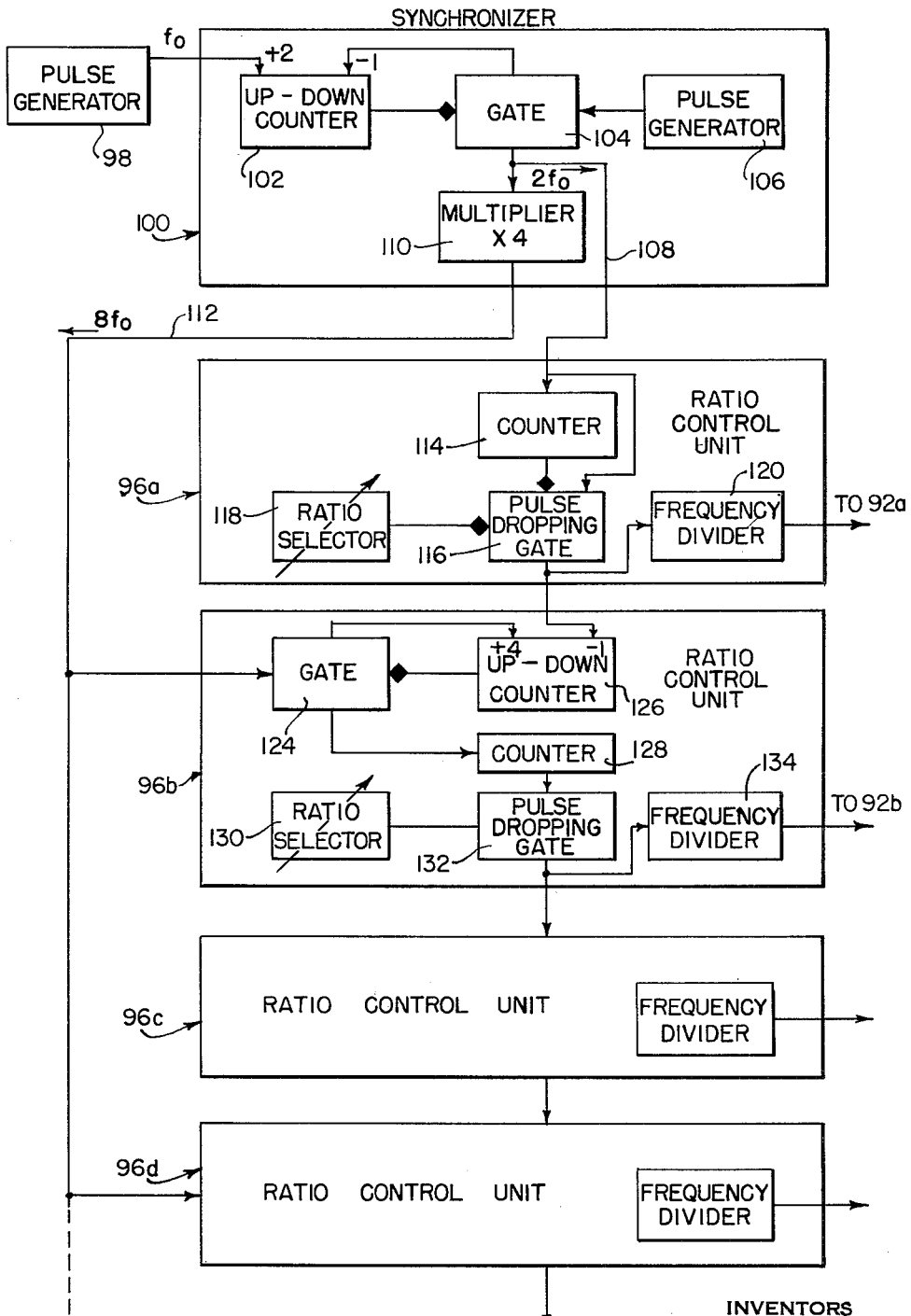
FIG. 5 is a fragmentary schematic diagram of a ratio control unit used in the rolling mill of FIG. 4.

In FIG. 5 we have illustrated the synchronizer 100 and ratio control units 96 which we prefer to use in the system of FIG. 4. The synchronizer 100 includes an up-down counter 102 which conditions a gate 104 to pass pulses from a pulse generator 106. The elements 102, 104 and 106 operate as a frequency multiplier emitting pulses at twice the frequency of the pulse generator 98.

More specifically, the pulse generator 106 has a frequency at least twice as great as the maximum frequency to be expected from the pulse generator 98. The gate 104 is ordinarily enabled so as to pass pulses from the generator 106 to the "down" input of the counter 102 and also to an output conductor 108. The gate is disabled whenever the content of the counter 102 is zero. The pulse generator 98 is connected to the "up" input of the counter 102. Each pulse from the generator 98 causes the counter to count up two counts, and each pulse from the generator 106 causes the counter to count down a single count. Assuming for example, that the content of the counter is initially zero, the gate 104 is disabled and therefore does not pass any pulses from the generator 106. The next pulse from the generator 98 reduces the count by two and the gate 104 begins to pass pulses from the generator 106. As soon as two pulses have passed through the gate 104, the content of the counter is again zero and the gate is disabled. This cycle keeps repeating and thus the gate 104 passes to the output conductor 108 two pulses from the generator 106 for every pulse emitted by the generator 98.

The synchronizer 100 also includes a frequency multiplier 110 receiving as its input the pulses on the conductor 108 and supplying pulses on an output conductor 112 at a frequency four times its input frequency, or $8f_0$. The multiplier 110 has the same construction and operation as the frequency doubler comprising the counter 102, gate 104 and pulse generator 106, except that it includes a pulse generator whose frequency is at least four times the maximum frequency of the input from the conductor 108. Also, its counter counts down by a count of four every time a pulse is received from the conductor 108. In this manner four pulses from the internal pulse generator in the multiplier 110 are supplied to the output conductor 112 for each pulse on the conductor 108.

The ratio control unit 96a includes a counter 114 which counts the pulses on the conductor 108 and aids in conditioning a pulse-dropping gate 116 connected to pass the pulses on this conductor. Specifically, the gate 116, which is ordinarily enabled, is disabled whenever the content of the counter 114 coincides with various numbers selected by a variable ratio selector 118. The selector 118 is set according to the number of pulses required from the control unit 96a for each pulse from the generator 98. Pulses arrive at the gate 116 at the rate $2f_0$ and the desired rate is obtained by eliminating selected ones of these pulses from the output of the gate. This is accomplished by means of a plurality of AND circuits (not shown) conditioned whenever the count in the counter 114 corresponds to the setting of a plurality of switches contained in the selector 118. Such coincidence disables a transistor within the gate 116 which ordinarily passes the pulses applied to the gate.

A simple example will clarify the operation of the pulse-dropping gate. Suppose that unity ratio is desired for the ratio control unit 96a. A switch in the selector 118 conditions an AND circuit having as its sole other input the output of the flip-flop containing the least significant digit in the counter 114. Thus this AND circuit has an output whenever the least significant digit in the counter is a one (or alternatively a zero). This occurs on alternate counts, i.e. once for every two pulses counted by the counter 114. Thus the gate 116 drops every second pulse from the conductor 108 and thereby passes one-half the pulses on this conductor. Since the pulse rate on the conductor 108 is $2f_0$, the output of the gate 116 has a pulse rate of $f_0$, equal to the pulse rate of the generator 98.

The counter 114 may illustratively have a capacity of several thousand. When it is filled it automatically resets and begins counting again so as to continue the pulse dropping operation of the gate 116.

The ratio control unit 96a also includes a frequency divider 120 whose input is derived from the gate 116 and whose output is the output of the control unit fed to the control circuit 92a. The divider 120 divides the frequency by a substantial amount, for example, a factor of 128. It takes the form of a counter whose capacity is the factor by which the frequency is to be divided. The counter emits an output pulse each time it reaches capacity and then automatically resets to begin counting again. The decreased frequency corresponds to the frequency required for operation by the control circuit 92a.

This means that the frequency of the pulse generator 98 is a substantial multiple of the frequency required for the command signal used by the control circuit 92a. The reason for this is that the operation of the frequency multipliers and pulse dropping gate 116 provides a pulse rate which though periodic over a number of pulses may vary substantially from pulse to pulse. If this were to take place at a low frequency, there might be unevenness in the operation of the rolling mill stage 72 (FIG. 4). By performing these operations on a high frequency signal and then, in essence, averaging the pulse rate over 128 pulses by means of the frequency divider 120, this unevenness is reduced to negligible proportions.

With further reference to FIG. 5, the ratio control unit 96B includes a frequency multiplier comprising a gate 124, and an up-down counter 126, connected to multiply the pulse rate at the output of the pulse dropping gate by a factor of 4. This multiplier operates in the same manner as the frequency multipliers incorporated in the synchronizer 100, except that the high frequency pulse source is the output conductor 112 of the synchronizer.

The output of the gate 124 is counted by a counter 128, which operates in conjunction with a ratio selector 130 to condition a pulse dropping gate 132 operating in the manner described above. The output of the gate 132 is reduced in frequency by a frequency divider 134 before being applied to the control circuit 92b.

The output of the pulse dropping gate 132 is also applied to the input of a ratio control unit 96c which has the same general construction as the control unit 96a. The next succeeding ratio control unit 96d is similar to the control unit 96b and the two types of ratio control unit continue alternating in this fashion. It will be appreciated that the particular factors by which frequencies are multiplied and divided in the individual ratio control units may vary from unit to unit according to the range of output speeds to be controlled by the outputs of the various units.

Inspection of the FIG. 5 shows that the ratio control units will provide the operation described above with reference to the rolling mill of FIG. 4. For example if the setting of the ratio selector 118 is changed to alter the ratio between the pulse rate at the output of the frequency divider 120 with respect to the pulse rate of the generator 98, the rate at which pulses are fed from the gate 116 to the ratio control unit 96b is changed in proportion. This causes a proportionate change in the pulse rate at the output of the frequency divider 134, even though the setting of the ratio selector 130 remains unchanged. In similar manner there are a proportion of changes in the pulse rates applied at the outputs of the ratio control units 96c and 96d.

An 8-inch bar mill was constructed using the system illustrated in FIG. 4 and incorporating the inner servo loop 20 of FIG. 1. The mill has ten stands, with successive stands spaced only 37 inches on center. It has operated successfully at speeds of up to 108 feet per minute at the input end and up to 800 feet per minute at the output. The combination of high speed and close inter-stand spacing permits material to pass through the mill in a very short time, thereby minimizing temperature drop in the material during the rolling operation and also minimizing the formation of scale on the material. The main mill motor is an 800 horsepower D.C. electric motor and the hydraulic differential drive permits the addition or subtraction of up to 30% of the base speed at any stand.

The rigorous accuracy requirement for the relative speeds of the stands is readily met by the speed control units. Moreover, the fast recovery from a transient permits substantial speed recovery at any stand before the disturbance reaches the next stand. More specifically, when the leading edge of stock enters a stand there is a sudden increase in the load on the stand, with a consequent decrease in the speed thereof. The system returns the stand speed almost to its assigned value before the leading edge reaches the next stand, thereby avoiding problems which might otherwise occur from an error in the relative speeds of the two stands if the material were to reach the second stand before the first one substantially recovered from the disturbance.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:
1. A speed control unit for control of the speed of an output member, said speed control unit comprising
 (A) an inner servo loop arranged to control the speed of said member,
 (B) a reference source providing a series of signals corresponding to commanded changes in the position of said member,
 (C) an outer servo loop including
   (1) a generator providing a series of signals corresponding to successive changes in the position of said member,
   (2) accumulating means connected to accumulate signals from said reference source and said generator
     (a) with opposite senses and
     (b) providing an output signal which changes when the frequencies of said generator and said reference source are unequal,
 (D) said inner loop being connected to use said output signal of said accumulating means as a velocity command signal.

2. The combination defined in claim 1 in which said inner servo loop is a direct velocity control loop arranged to
 (A) develop a velocity feedback signal corresponding to the velocity of said output member, and
 (B) compare said velocity feedback signal with said velocity command signal to develop an error signal providing correction of said speed of said member.

3. The combination defined in claim 1 in which said inner loop is an indirect velocity control loop including
 (A) a velocity control element, said speed of said member being a function of the position of said control element,
 (B) a position transducer providing a feedback signal indicative of the position of said velocity control element, and
 (C) means for comparing said signal from said position transducer with said velocity command signal to develop an error signal providing for correction of said position of said velocity control element.

4. The combination defined in claim 1 including
 (A) a hydraulic motor coupled to said output member,
 (B) a hydraulic pump connected to power said motor,
 (C) flow control means for controlling the flow of hydraulic fluid from said pump, and
 (D) means in said inner servo loop adjusting said flow control means in response to an error signal developed by comparing a feedback signal with said velocity command signal.

5. The combination defined in claim 4 including a tachometer connected to said output member and generating said feedback signal.

6. A speed control system comprising
 (A) a first motor,
 (B) a first shaft connected to said first motor,
 (C) a second motor,
 (D) a second shaft connected to said second motor,
 (E) a third shaft
 (F) a differential
   (1) connected to said first, second and third shafts and
   (2) moving said third shaft at a speed which is the algebraic sum of the speeds of said first and second shafts,
 (G) an inner servo loop arranged to control the speed of said second motor,
 (H) a reference source providing a series of signals corresponding to commanded changes in the position of said third shaft,
 (I) an outer servo loop including
   (1) a generator providing a series of signals corresponding to successive changes in the position of said third shaft,
   (2) accumulating means accumulating said signals from said reference source and said generator and providing an output signal
     (a) in which said signals from said reference source on said generator have the opposite effect, and
     (b) which changes in response to differences in the frequencies of said reference source and said generator,
 (J) said inner loop being connected to use said output signal of said accumulating means as a velocity command signal.

7. The combination defined in claim 6 in which said inner servo loop includes
 (A) means developing a velocity feedback signal corresponding to the speed of said third shaft, and
 (B) means for comparing said velocity feedback signal with said velocity command signal to develop an error signal for correction of the speed of said third shaft.

8. The combination defined in claim 6 in which said reference source is a generator connected to provide a series of signals corresponding to successive changes in position of said first shaft.

9. The combination defined in claim 8 in which said accumulating means comprises
 (A) an up-down counter
   (1) counting said signals from said reference source in one direction, and
   (2) counting said signals from said generator in the opposite direction, and
 (B) a digital-to-analog converter providing an output signal which is an analog of the content of said counter.

10. The combination defined in claim 6 in which said accumulating means comprises
 (A) an up-down counter
   (1) counting said signals from said reference source in one direction, and
   (2) counting said signals from said generator in the opposite direction, and
 (B) a digital-to-analog converter providing an output signal which is an analog of the content of said counter.

11. A speed control unit for control of the speed of an output member, said speed control unit comprising
 (A) an inner servo loop arranged to control the speed of said member,
 (B) a reference pulse generator,
 (C) an outer servo loop including
   (1) an up-down counter having up and down inputs,
   (2) a position transducer developing a series of pulses representing predetermined changes of position of said member,
   (3) means applying the pulses from said position transducer to one of said counter inputs and the pulses from said pulse generator to the other of said counter inputs,
   (4) a digital-to-analog converter providing an analog representation of the contents of said counter,
 (D) said inner servo loop being connected to utilize the output of said digital-to-analog converter as a velocity command signal.

12. The combination defined in claim 11 in which said inner servo loop includes
 (A) a velocity transducer providing a feedback signal indicative of the speed of said member, and
 (B) means comparing said feedback signal with said velocity command signal to provide an error signal for correction of the speed of said output member.

13. The combination defined in claim 11 in which said inner servo loop includes
 (A) a velocity control element, said speed of said output member being a function of the position of said control element,
 (B) a position transducer providing a feedback signal indicative of the position of said control element, and
 (C) means comparing said feedback signal with said velocity command signal to provide an error signal for correction of said speed of said output member.

14. The combination defined in claim 13
 (A) including means offsetting the content of said counter,
 (B) whereby said command signal has a first sense when said content is above a given level and a second sense when said content is below said level.

15. The combination defined in claim 11 including
 (A) a hydraulic motor coupled to said member,
 (B) a hydraulic pump arranged to power said motor,
 (C) means providing an inner servo loop feedback signal,
 (D) means in said inner loop comparing said feedback signal with said velocity command signal to provide an error signal, and
 (E) means controlling the flow of fluid from said pump to said motor in accordance with said error signal.

16. A speed control unit comprising
 (A) a first motor,
 (B) a first shaft coupled to said first motor,
 (C) a second motor,
 (D) a second shaft coupled to said second motor,
 (E) a third shaft,
 (F) a differential connected to rotate said third shaft at a speed which is the algebraic sum of the speeds of said first and second shafts,
 (G) a reference signal source providing a series of signals corresponding to successive commanded changes in the position of said third shaft,
 (H) a first generator providing a series of signals corresponding to actual changes in position of said third shaft,
 (I) an up-down counter having up and down inputs,
 (J) means applying said signals from said reference source to one of said counter inputs and the signals from said generator to the other of said counter inputs,
 (K) a digital-to-analog converter providing an analog representation of the content of said counter,
 (L) an inner servo loop connected to control the speed of said second motor in response to an error signal resulting from comparison of a velocity feedback signal with a velocity command signal,
 (M) said inner loop being connected to employ said output signal of said digital-to-analog converter as said velocity command signal.

17. The combination defined in claim 16 in which said inner servo loop includes
 (A) a tachometer connected to said third shaft and providing a feedback signal indicative of the velocity of said third shaft, and
 (B) means for comparing said feedback signal with said command signal to provide said error signal.

18. The combination defined in claim 16 in which said reference source includes
 (A) a second generator connected to provide a series of signals corresponding to successive changes in the position of said first shaft, and
 (B) ratio means providing a series of signals whose rate bears a predetermined relationship to the rate of the signals from said second generator.

19. A multiple output mechanical system providing control of the speeds of a plurality of outputs, said system comprising
 (A) at least first and second speed control units, each of said speed control units including
   (1) a motor driving an output shaft,
   (2) an inner servo loop controlling the speed of said motor,
   (3) a reference signal source providing a series of reference signals corresponding to successive commanded changes in the position of said output shaft,
   (4) a feedback generator providing a series of signals corresponding to actual changes in position of said output shaft,
   (5) accumulating means connected to accumulate said signals from said reference source and said generator
     (a) with opposite senses and
     (b) so as to provide an output signal which changes when the frequencies of said generator and reference source signals are unequal,
   (6) said inner servo loop being connected to use said output signal of said accumulating means as a velocity command signal,
 (B) said reference signal source of said second speed control unit comprising a ratio control unit which provides said reference signals at a rate which is a variable predetermined ratio of the rate of said reference signals of said first speed control unit.

20. The combination defined in claim 19 in which each of said inner servo loops includes
(A) a velocity transducer providing a feedback signal which is a function of the speed of the motor controlled by said loop, and
(B) means comparing said feedback signal with said velocity command signal to provide an error signal for correction of said speed of said motor.

21. A multiple output mechanical system providing control of the speeds of a plurality of output shafts, said system comprising
(A) a main motor,
(B) a plurality of stages, each of said stages comprising
   (1) an auxiliary motor,
   (2) a differential having
      (a) a first input connected to said main motor and a second input connected to said auxiliary motor of said stage, and
      (b) driving an output shaft at a speed which is the algebraic sum of the speeds of said inputs,
   (3) a reference signal source providing a series of reference signals corresponding to successive commanded changes in the position of said output shaft,
   (4) a first generator providing a series of signals corresponding to actual changes in position of said output shaft,
   (5) an up-down counter having up and down inputs,
   (6) means applying said signals from said reference source to one of said counter inputs and the signals from said generator to the other of said counter inputs,
   (7) a digital-to-analog converter providing an analog representation of the content of said counter,
   (8) an inner servo loop connected to control the speed of said auxiliary motor,
   (9) said inner loop being connected to employ said output signal of said digital-to-analog converter as its command signal,
(C) each of said reference sources in all but a first one of said speed control units comprising a ratio control unit providing reference signals having a rate at which reference signals are emitted by another of said reference sources from which it derives its input,
(D) said ratio control units being inter-connected in a string thereof, with one of said ratio control units deriving its input signals from said reference source of said first speed control unit.

22. The combination defined in claim 21 in which said reference source of said first speed control unit includes means providing a series of signals corresponding to changes in the position of said main motor.

23. The combination defined in claim 21 in which each of said inner servo loops includes
(A) a tachometer connected to the output shaft of the speed control unit incorporating said loop and providing a feedback signal indicative of the velocity of said output shaft, and
(B) means comparing said feedback signal with the command signal for said loop to provide an error signal for correction of the speed of the auxiliary motor controlled by said loop.

24. The combination defined in claim 21 in which each of said inner servo loop includes
(A) a velocity control element, the speed of the auxiliary motor controlled by said loop being a function of the position of said control element,
(B) a position transducer providing a feedback signal indicative of the position of said control element, and
(C) means comparing said feedback signal with said velocity command signal to provide an error signal for correction of the speed of said auxiliary motor.

25. The combination defined in claim 24 including means in each speed control unit for offsetting the content of the counter in said unit, whereby said command signal in said unit has a first sense when said content is above a given level and a second sense when said content is below said level.

References Cited by the Examiner

UNITED STATES PATENTS

| | | | |
|---|---|---|---|
| 2,526,665 | 10/1950 | Hull et al. | 60—53 |
| 2,581,149 | 1/1952 | Shaw | 60—53 |
| 2,654,999 | 10/1953 | Berge | 60—53 |
| 2,871,660 | 2/1959 | McDonald et al. | 60—53 |
| 2,932,471 | 4/1960 | Exner et al. | 244—77 |
| 2,955,210 | 10/1960 | Dean et al. | 60—53 X |

OTHER REFERENCES

Wilson: Digital Systems for Speed Control Automation, September 1962, pages 62–65.

JULIUS E. WEST, *Primary Examiner.*

EDGAR W. GEOGHEGAN, *Examiner.*

UNITED STATES PATENT OFFICE
CERTIFICATE OF CORRECTION

Patent No. 3,225,542                           December 28, 1965

Jack T. Hansen et al.

It is hereby certified that error appears in the above numbered patent requiring correction and that the said Letters Patent should read as corrected below.

Column 17, line 43, beginning with "(C) each of" cancel all to and including "its input," in line 47, same column 17 and insert > (C) each of said reference sources in all but a first one of said speed control units comprising a ratio control unit providing reference signals having a rate which is a variable predetermined ratio of the rate at which reference signals are emitted by another of said reference sources from which it derives its input, Signed and sealed this 4th day of November 1969.

(SEAL)
Attest:

EDWARD M. FLETCHER, JR.                   WILLIAM E. SCHUYLER, JR.
Attesting Officer                              Commissioner of Patents